(12) United States Patent
Wang et al.

(10) Patent No.: US 8,167,554 B2
(45) Date of Patent: May 1, 2012

(54) ACTUATABLE SURFACE FEATURES FOR WIND TURBINE ROTOR BLADES

(75) Inventors: Jing Wang, Simpsonville, SC (US);
Edward Lee McGrath, Greer, SC (US);
Thomas Joseph Fischetti, Simpsonville, SC (US)

(73) Assignee: General Electric Corporation, Schenectady, NY (US)

( * ) Notice: Subject to any disclaimer, the term of this patent is extended or adjusted under 35 U.S.C. 154(b) by 0 days.

(21) Appl. No.: 13/015,693

(22) Filed: Jan. 28, 2011

(65) Prior Publication Data

US 2011/0223033 A1    Sep. 15, 2011

(51) Int. Cl.
*B64C 9/00*    (2006.01)
(52) U.S. Cl. ........................ 416/23; 244/204.1
(58) Field of Classification Search ............... 244/199.1, 244/200, 200.1, 201, 204, 204.1, 206, 213; 416/23, 24, 87, 169 R
See application file for complete search history.

(56) References Cited

U.S. PATENT DOCUMENTS

| | | | |
|---|---|---|---|
| 2,852,211 A * | 9/1958 | Xenakis | 244/203 |
| 4,039,161 A * | 8/1977 | Bauer | 244/213 |
| 4,082,479 A | 4/1978 | Rangi et al. | |
| 4,500,257 A | 2/1985 | Sullivan | |
| 4,692,095 A | 9/1987 | Lawson-Tancred | |
| 4,715,782 A | 12/1987 | Shimmel | |
| 5,106,265 A | 4/1992 | Holzem | |
| 5,253,828 A | 10/1993 | Cox | |
| 5,570,859 A | 11/1996 | Quandt | |
| 6,033,180 A * | 3/2000 | Machida | 416/23 |
| 6,105,904 A | 8/2000 | Lisy et al. | |
| 6,427,948 B1 | 8/2002 | Campbell | |
| 7,070,144 B1 * | 7/2006 | DiCocco et al. | 244/3.21 |
| 7,293,959 B2 | 11/2007 | Pedersen et al. | |
| 7,585,157 B2 | 9/2009 | Quell et al. | |
| 7,604,461 B2 | 10/2009 | Bonnet | |
| 7,878,459 B2 * | 2/2011 | Mabe et al. | 244/213 |
| 2006/0140760 A1 | 6/2006 | Saddoughi et al. | |
| 2007/0231151 A1 | 10/2007 | Herr et al. | |
| 2008/0175711 A1 | 7/2008 | Godsk et al. | |
| 2009/0068018 A1 | 3/2009 | Corten | |
| 2009/0280009 A1 | 11/2009 | Brock | |
| 2009/0284016 A1 | 11/2009 | Van Dam et al. | |

(Continued)

FOREIGN PATENT DOCUMENTS

EP    0947693    10/1999

(Continued)

OTHER PUBLICATIONS

English Abstract of EP 0947693.

(Continued)

*Primary Examiner* — Edward Look
*Assistant Examiner* — Ryan Ellis
(74) *Attorney, Agent, or Firm* — Dority & Manning, P.A.

(57) ABSTRACT

A rotor blade for a wind turbine is disclosed. The rotor blade may generally include a shell having a pressure side and a suction side. The shell may define an opening in at least one of the pressure and suction sides. The rotor blade may also include a base and at least two surface features spaced apart along the outer perimeter of the base. The base may generally be movable relative to the opening between a recessed position and an actuated position. Additionally, the base may be rotatable within the shell in order to adjust which of the surface features is received within the opening when the base is moved to the actuated position.

20 Claims, 8 Drawing Sheets

U.S. PATENT DOCUMENTS

| | | |
|---|---|---|
| 2009/0285682 A1 | 11/2009 | Baker et al. |
| 2010/0104436 A1 | 4/2010 | Herr et al. |
| 2011/0110777 A1* | 5/2011 | Abdallah et al. ........ 416/23 |

FOREIGN PATENT DOCUMENTS

| | | |
|---|---|---|
| EP | 1674723 | 6/2006 |
| EP | 1772623 | 4/2007 |
| EP | 1896323 | 3/2008 |
| EP | 1944505 | 7/2008 |
| EP | 2098721 | 9/2009 |
| JP | 4029063 | 1/1992 |
| WO | WO 00/15961 | 3/2000 |
| WO | WO 01/16482 | 3/2001 |
| WO | WO 2007/005687 | 1/2007 |
| WO | WO 2007/065434 | 6/2007 |
| WO | WO 2007/140771 | 12/2007 |
| WO | WO 2008/113349 | 9/2008 |
| WO | WO 2008/113350 | 9/2008 |

OTHER PUBLICATIONS

English Abstract of JP 4029063.

van Dam, C.P.; "Airfoils for Structures-Passive and Active Load Control for Wind Turbine Blades", Department of Mechanical and Aeronautical Engineering, University of California-Davis.

Vronsky, T.; "High Performance Cost-Effective Large Wind Turbine Blades Using Air-Jet Vortex Generators", ETSU W/41/00541/REP, 2000.

Co-pending and commonly assigned U.S. Appl. No. 12/829,456, filed Jul. 2, 2010.

* cited by examiner

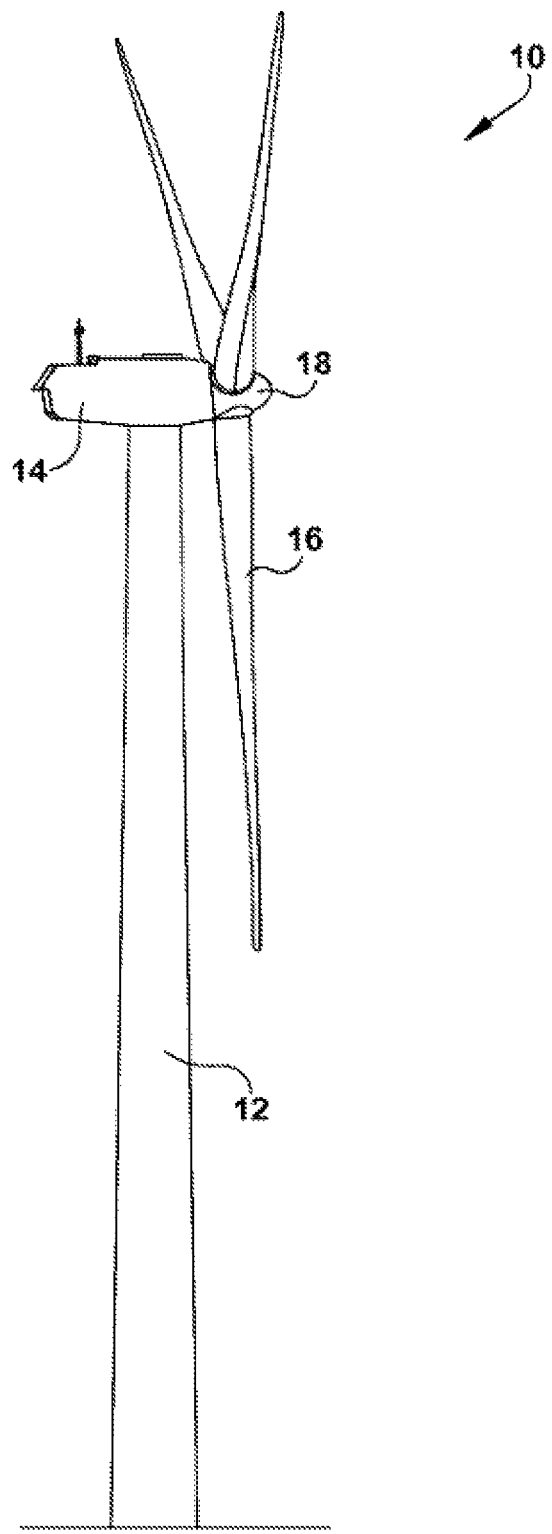
FIG. -1-

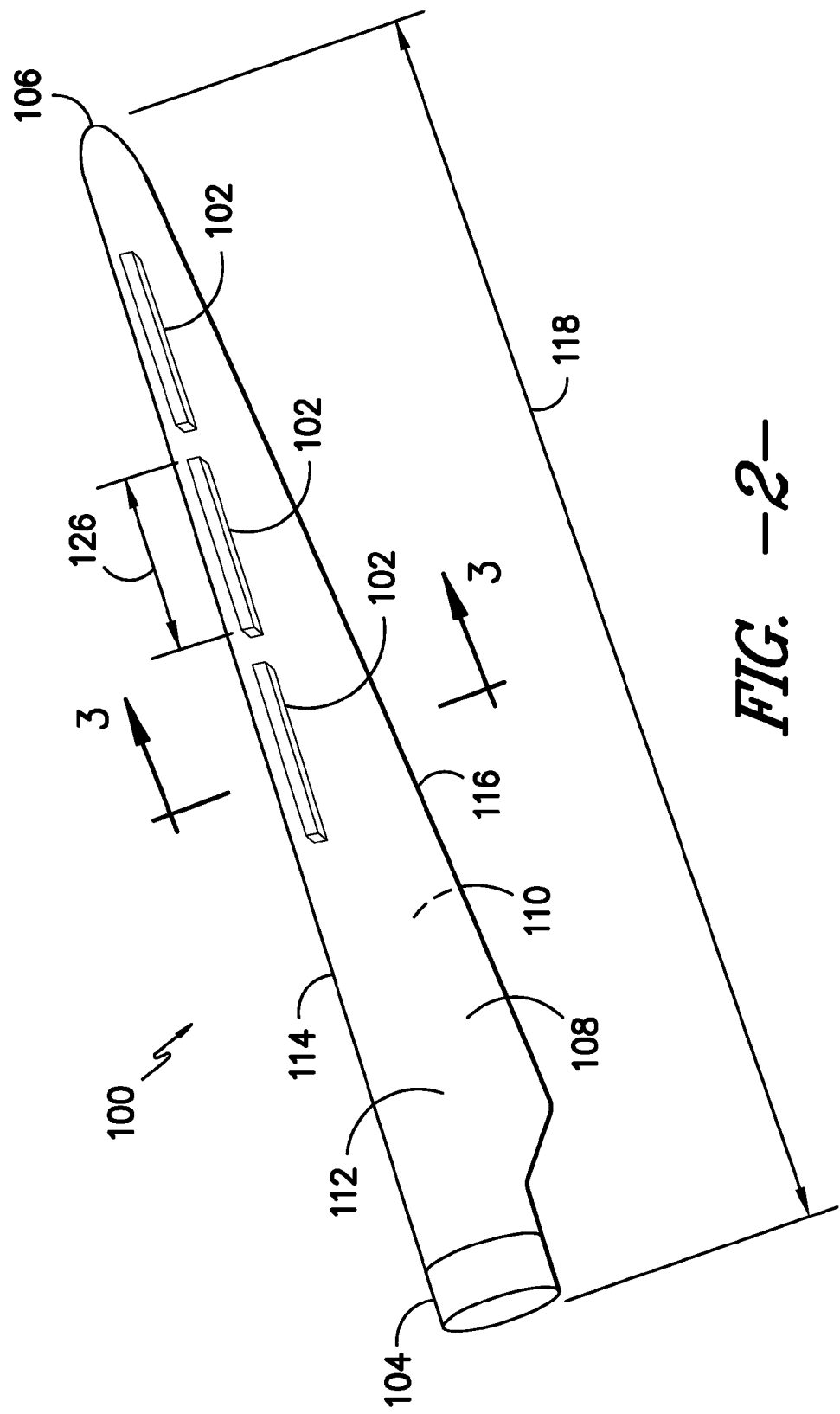
FIG. -2-

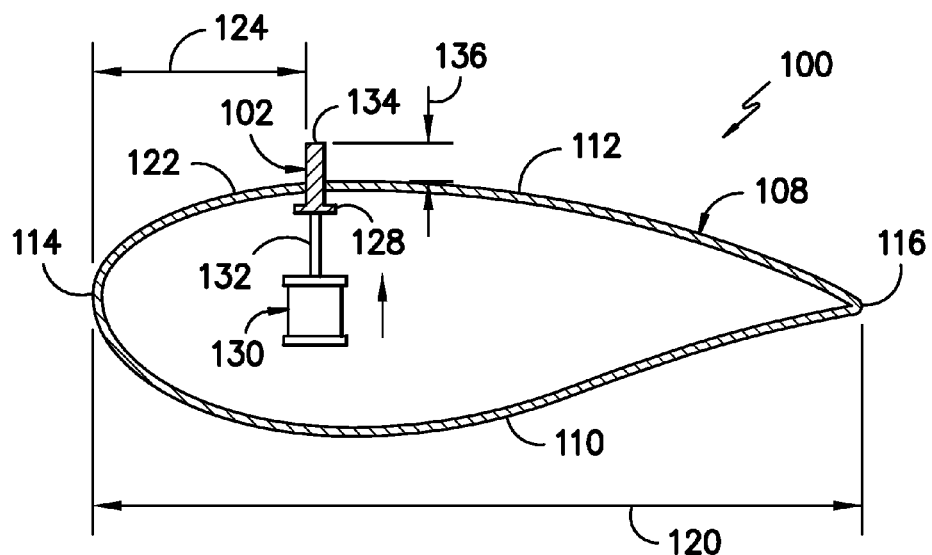
FIG. -3-
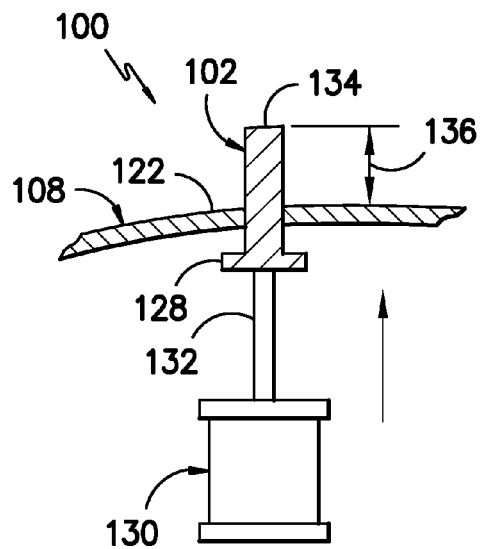   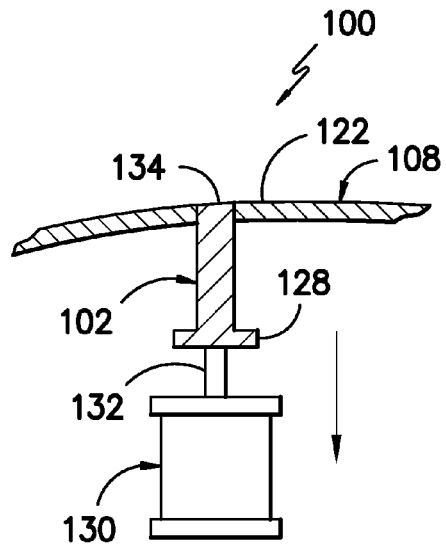
FIG. -4-    FIG. -5-

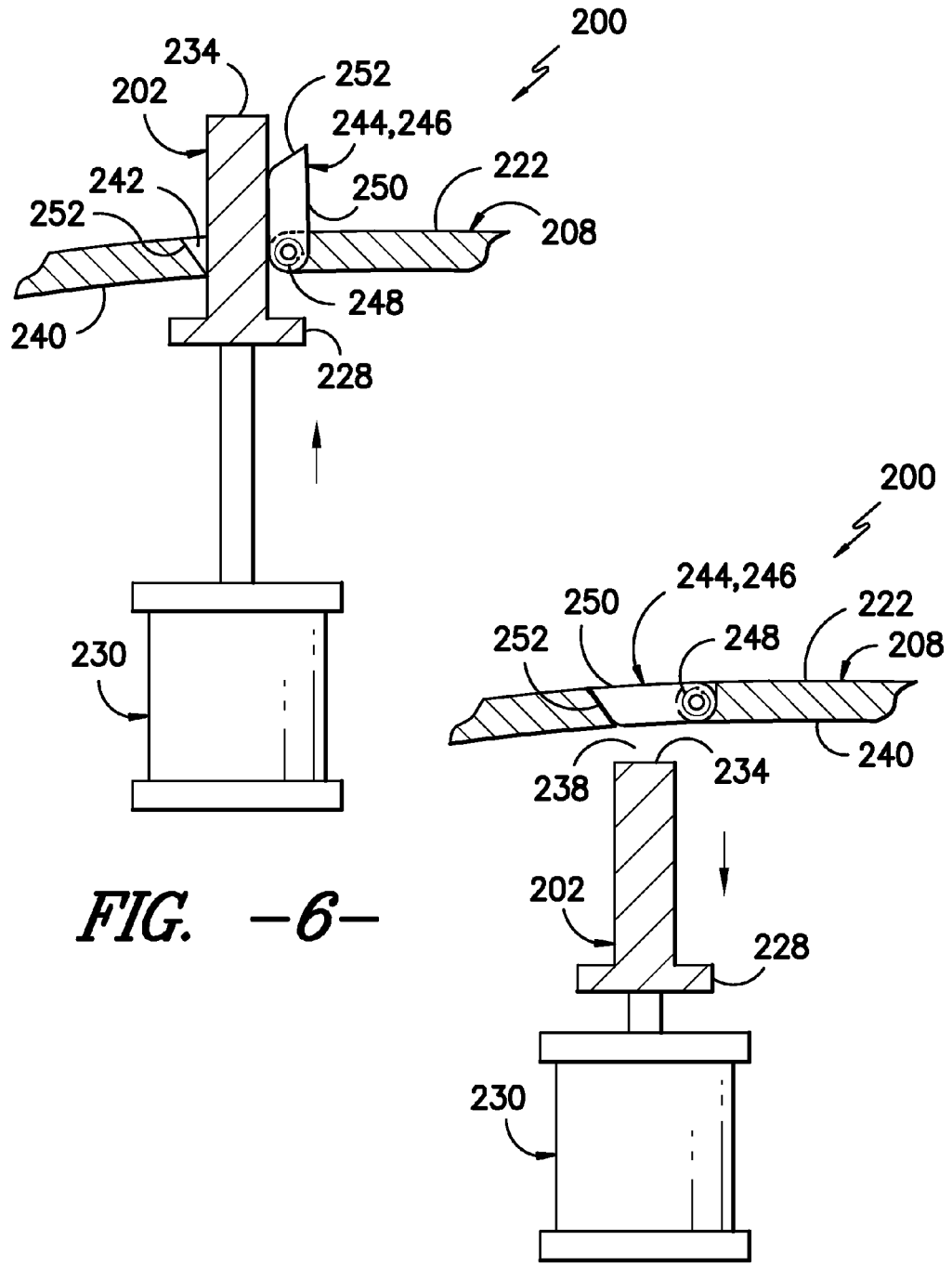

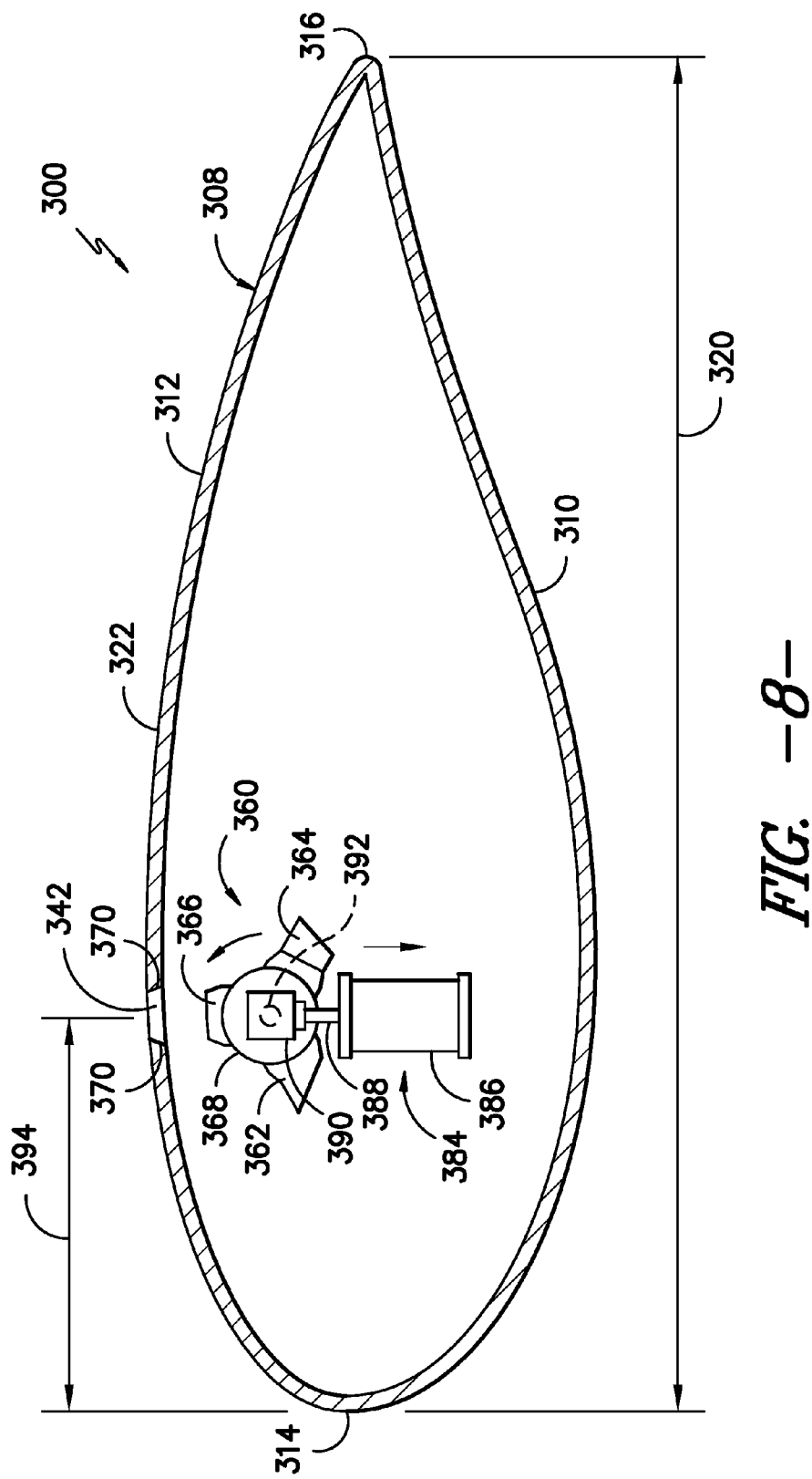
FIG. -8-

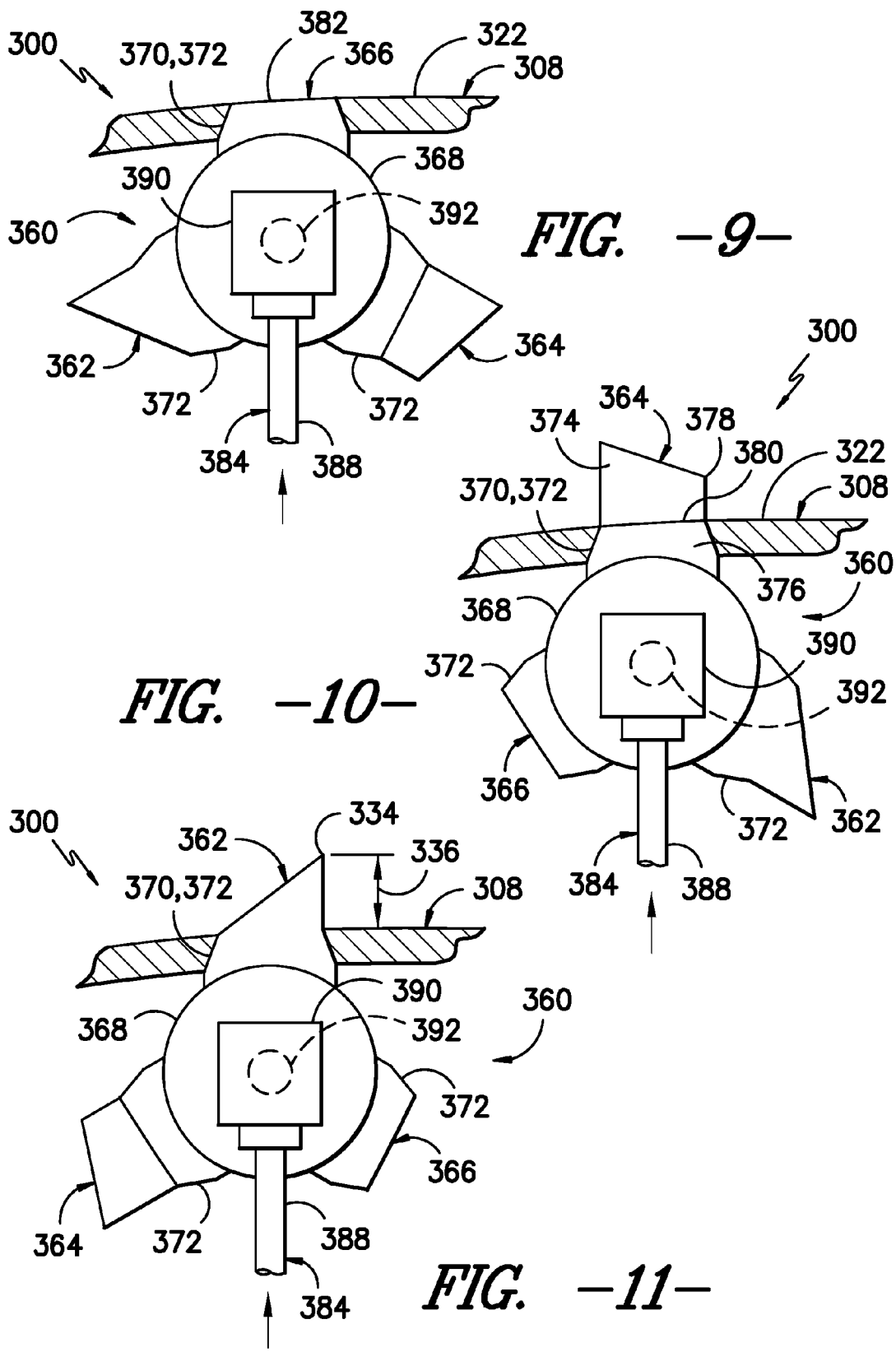

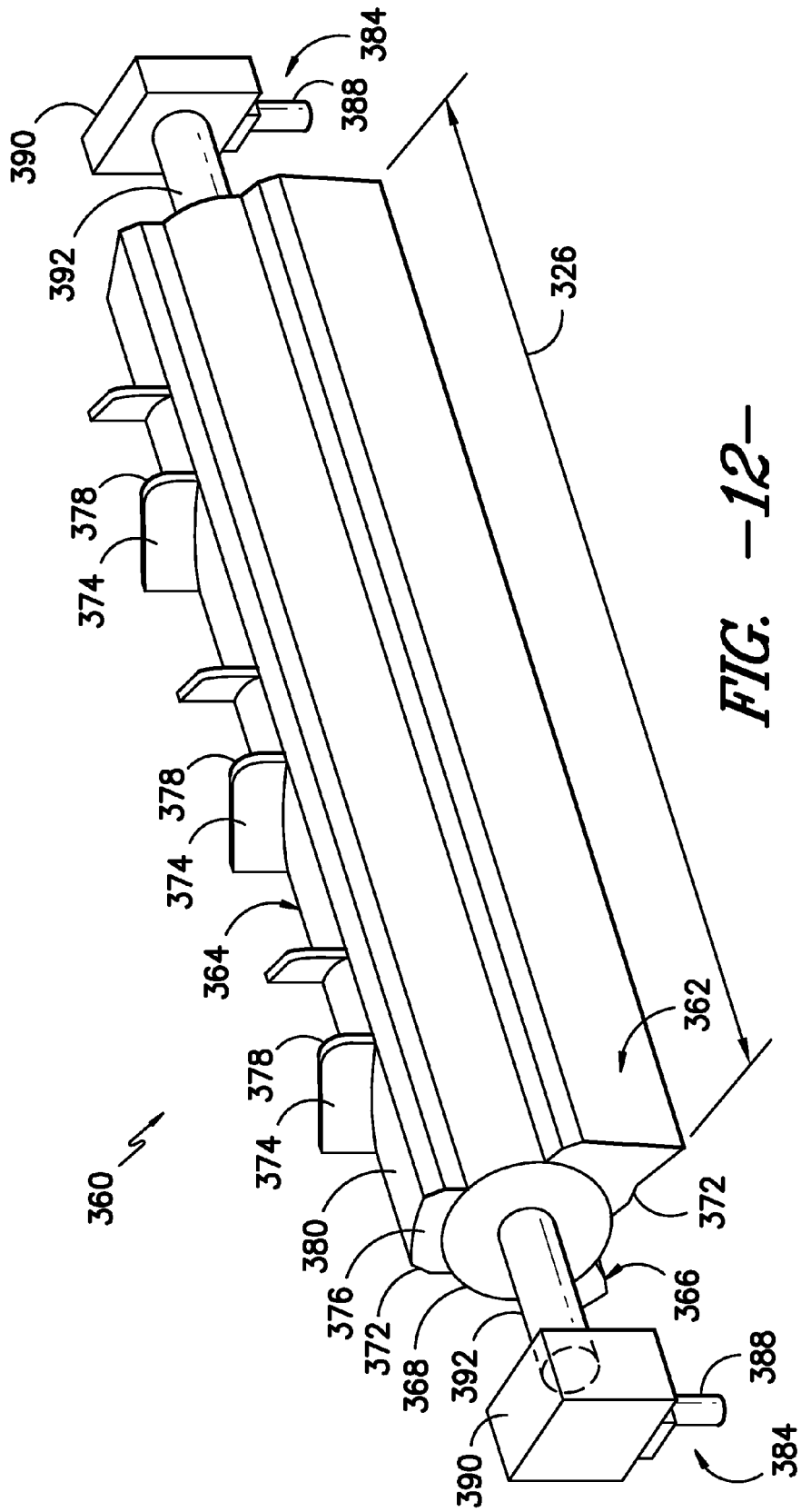
FIG. -12-

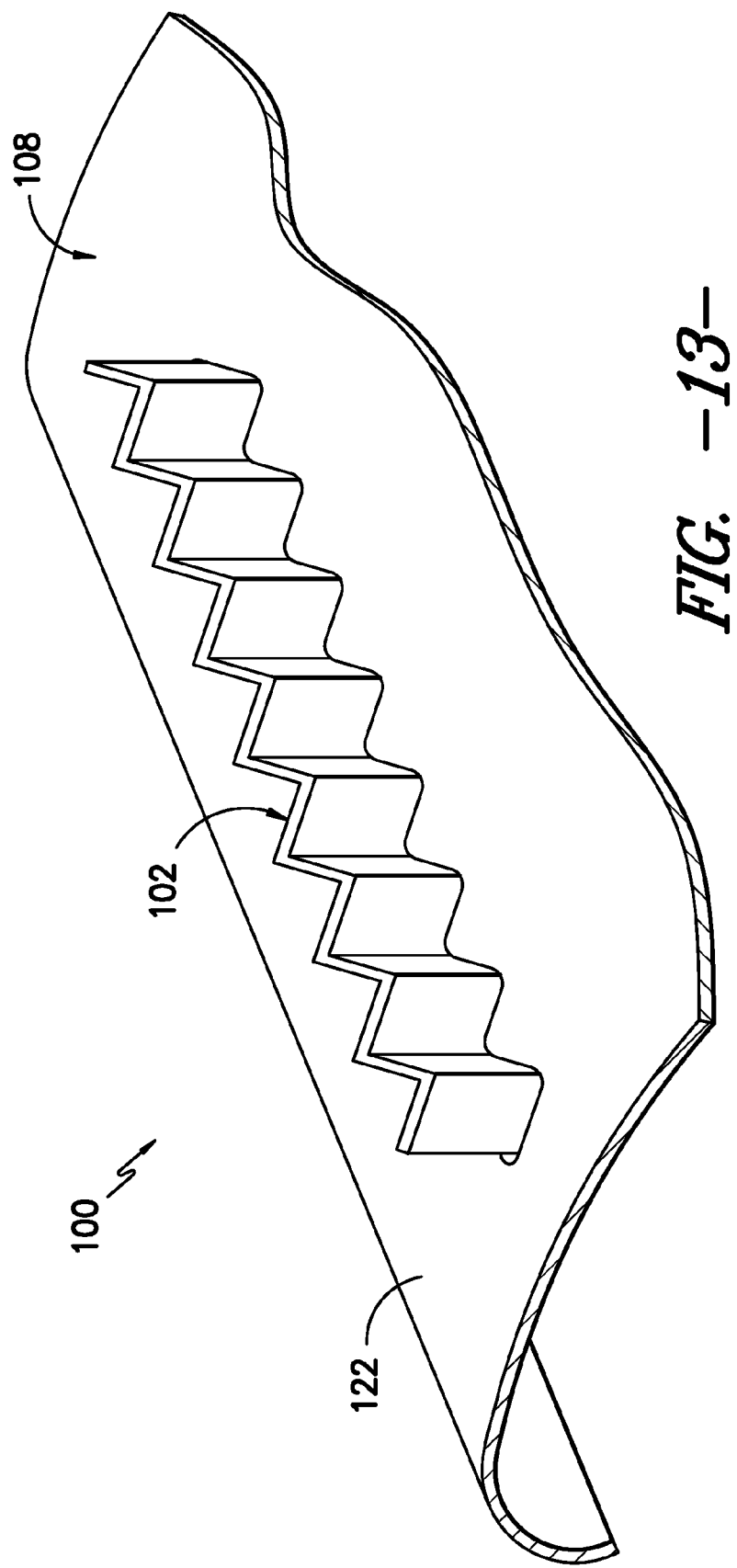
FIG. -13-

ACTUATABLE SURFACE FEATURES FOR WIND TURBINE ROTOR BLADES

FIELD OF THE INVENTION

The present subject matter relates generally to wind turbines and, more particularly, to actuatable surface features for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The particular size of wind turbine rotor blades is a significant factor contributing to the overall efficiency of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative energy source. However, as rotor blade sizes increase, so do the loads transferred through the blades to other components of the wind turbine (e.g., the wind turbine hub and other components). For example, longer rotor blades result in higher loads due to the increased mass of the blades as well as the increased aerodynamic loads acting along the span of the blade. Such increased loads can be particularly problematic in high-speed wind conditions, as the loads transferred through the rotor blades may exceed the load-bearing capabilities of other wind turbine components.

Certain surface features, such as spoilers, are known that may be utilized to separate the flow of air from the outer surface of a rotor blade, thereby reducing the lift generated by the blade and reducing the loads acting on the blade. However, these surface features are typically designed to be permanently disposed along the outer surface of the rotor blade. As such, the amount of lift generated by the rotor blade is reduced regardless of the conditions in which the wind turbine is operating. Thus, there is a need for a surface feature, such as an actuatable spoiler, that permits the loads acting on a rotor blade to be efficiently shed when desired (e.g., during high-speed wind conditions, such as wind gusts) without reducing the overall efficiency of the rotor blade during other operating conditions.

Additionally, various other surface features, such as vortex generators, are known that may be utilized to delay separation of the air flowing over a rotor blade, such as when the blade is oriented at a high angle of attack relative to the direction of the airflow. However, these surface features also produce drag on the rotor blade, thereby reducing the overall efficiency of the blade. Thus, there is a need for a surface feature, such as an actuatable vortex generator, that may be used to delay separation of the airflow from the rotor blade when needed (e.g., when the rotor blade is oriented at high angles of attack) without reducing the overall efficiency of the rotor blade when flow separation is not an issue.

Accordingly, a rotor blade having one or more actuatable surface features would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a rotor blade for a wind turbine. The rotor blade may generally include a shell having a pressure side and a suction side. The shell may define an opening in at least one of the pressure and suction sides. The rotor blade may also include a base and at least two surface features spaced apart along the outer perimeter of the base. The base may generally be movable relative to the opening between a recessed position and an actuated position. Additionally, the base may be rotatable within the shell in order to adjust which of the surface features is received within the opening when the base is moved to the actuated position.

In another aspect, the present subject matter discloses a wind turbine including a tower and a nacelle mounted atop the tower. The wind turbine may also include a rotor hub coupled to the nacelle and a plurality of rotor blades extending from the rotor blade. At least one of the rotor blades may include a shell having a pressure side and a suction side. The shell may define an opening in at least one of the pressure and suction sides. The rotor blade may also include a base and at least two surface features spaced apart along the outer perimeter of the base. The base may generally be movable relative to the opening between a recessed position and an actuated position. Additionally, the base may be rotatable within the shell in order to adjust which of the surface features is received within the opening when the base is moved to the actuated position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine of conventional construction;

FIG. 2 illustrates a perspective view of one embodiment of a rotor blade having actuatable surface features in accordance with aspects of the present subject matter;

FIG. 3 illustrates a cross-sectional view of the rotor blade shown in FIG. 2 taken along line 3-3;

FIG. 4 illustrates a partial, cross-sectional view of the rotor blade shown in FIG. 3, particularly illustrating an actuatable surface feature of the rotor blade in an actuated position;

FIG. 5 illustrates another partial, cross-sectional view of the rotor blade shown in FIG. 3, particularly illustrating an actuatable surface feature of the rotor blade in a recessed position;

FIG. 6 illustrates a partial, cross-sectional view of another embodiment of a rotor blade having an actuatable surface feature in accordance with aspects of the present subject matter, particularly illustrating the actuatable surface feature in an actuated position;

FIG. 7 illustrates another partial, cross-sectional view of the rotor blade shown in FIG. 6, particularly illustrating the actuatable surface feature in a recessed position;

FIG. 8 illustrates a cross-sectional view of one embodiment of a rotor blade having an actuatable surface feature assembly in accordance with aspects of the present subject matter;

FIG. 9 illustrates a partial, cross-sectional view of the rotor blade shown in FIG. 8, particularly illustrating the surface feature assembly in an actuated position wherein a skin segment of the surface feature assembly is received within an opening defined in the blade;

FIG. 10 illustrates another partial, cross-sectional view of the rotor blade shown in FIG. 8, particularly illustrating the surface feature assembly in an actuated position wherein a vortex generator of the surface feature assembly is received within an opening defined in the blade;

FIG. 11 illustrates a further partial, cross-sectional view of the rotor blade shown in FIG. 8, particularly illustrating the surface feature assembly in an actuated position wherein a spoiler of the surface feature assembly is received within an opening defined in the blade;

FIG. 12 illustrates a perspective view of the surface feature assembly shown in FIG. 8; and, FIG. 13 illustrates a perspective view of one embodiment of an actuatable surface feature having airflow features in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates perspective view of a wind turbine 10 of conventional construction. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the view of FIG. 1 is provided for illustrative purposes only to place the present subject matter in an exemplary field of use. Thus, one of ordinary skill in the art should readily appreciate that the present subject matter need not be limited to any particular type of wind turbine configuration.

Referring now to FIGS. 2-5, there is illustrated one embodiment of a rotor blade 100 having one or more actuatable surface features 102 in accordance with aspects of the present subject matter. In particular, FIG. 2 illustrates a perspective view of the rotor blade 100 having a plurality of spoilers 102 spaced apart therein. FIG. 3 illustrates a cross-sectional view of the rotor blade 100 shown in FIG. 2 taken along the sectional line 3-3. FIG. 4 illustrates a partial, cross-sectional view of the rotor blade 100 shown in FIG. 3, particularly illustrating the spoiler 102 in an actuated position. Additionally, FIG. 5 illustrates another partial, cross-sectional view of the rotor blade 100 shown in FIG. 3, particularly illustrating the spoiler 102 in a recessed position.

In general, the disclosed rotor blade 100 may include a blade root 104 configured for mounting the rotor blade 100 to the hub 18 of the wind turbine 10 (FIG. 1) and a blade tip 106 disposed opposite the blade root 104. A shell 108 of the rotor blade 100 may generally be configured to extend between the blade root 104 and the blade tip 106 and may serve as the outer casing/covering of the blade 100. In several embodiments, the shell 108 may define a substantially aerodynamic profile, such as by defining a symmetrical or cambered airfoil-shaped cross-section. As such, the shell 108 may define a pressure side 110 and a suction side 112 extending between a leading edge 114 and a trailing edge 116. Further, the rotor blade 100 may have a span 118 defining the total length between the blade root 104 and the blade tip 106 and a chord 120 defining the total length between the leading edge 114 and the trailing edge 116. As is generally understood, the chord 120 may vary in length with respect to the span 118 as the rotor blade 100 extends from the blade root 104 to the blade tip 106.

In several embodiments, the shell 108 of the rotor blade 100 may be formed as a single, unitary component. Alternatively, the shell 108 may be formed from a plurality of shell components. For example, the shell 108 may be manufactured from a first shell half generally defining the pressure side 110 of the rotor blade 100 and a second shell half generally defining the suction side 112 of the rotor blade 100, with the shell halves being secured to one another at the leading and trailing edges 114, 116 of the blade 100. Additionally, the shell 108 may generally be formed from any suitable material. For instance, in one embodiment, the shell 108 may be formed entirely from a laminate composite material, such as a carbon fiber reinforced laminate composite or a glass fiber reinforced laminate composite. Alternatively, one or more portions of the shell 108 may be configured as a layered construction and may include a core material, formed from a lightweight material such as wood (e.g., balsa), foam (e.g., extruded polystyrene foam) or a combination of such materials, disposed between layers of laminate composite material.

It should be appreciated that the rotor blade 100 may also include one or more internal structural components. For example, in several embodiments, the rotor blade 100 may include one or more shear webs (not shown) extending between corresponding spar caps (not shown). However, in other embodiments, the rotor blade 100 of the present disclosure may have any other suitable internal configuration.

Referring still to FIGS. 2-5, the rotor blade 100 may also include one or more actuatable spoilers 102 configured to be selectively actuated from within the shell 108. In particular, the spoilers 102 may be movable between an actuated position (FIGS. 2-4), wherein at least a portion of each spoiler 102 is positioned outside the shell 108, and a recessed position (FIG. 5), wherein each spoiler 102 is generally aligned with or disposed below an outer surface 122 of the shell 108. As such, at times of increased loading on the rotor blade 100 (e.g., during operation in high-speed wind conditions), the spoilers 102 may be moved to the actuated position in order to separate the air flowing over the rotor blade 100 from the outer surface 122 of the shell 108, thereby reducing the lift generated by the blade 100 and decreasing the loads transferred through the blade 100 to other components of the wind turbine 10 (e.g., the wind turbine hub 18 (FIG. 1)). However, when blade loading is not an issue (e.g., in low-speed wind conditions), the spoilers 102 may be moved to and/or remain in the recessed position so as to not affect the performance and/or efficiency of the rotor blade 100.

In general, the rotor blade 100 may be configured to include any number of spoilers 102. For example, in the illustrated embodiment, the rotor blade 100 includes three spoilers 102 spaced apart along the blade 100. However, in alternative embodiments, the rotor blade 100 may include fewer than three spoilers 102, such as one spoiler 102 or two spoilers 102, or greater than three spoilers 102, such as four spoilers 102, five spoilers 102 or more than five spoilers 102. Additionally, each spoiler 102 may generally be disposed at any location on the rotor blade 100. For instance, as shown, each spoiler 102 is positioned on the suction side 112 of the rotor blade 100. In alternative embodiments, each spoiler 102 may be positioned on the pressure side 110 of the rotor blade 100 or spoilers 102 may be positioned on each side 110, 112 of the rotor blade 100. Similarly, the spoilers 102 may generally be disposed at any suitable location along the span 118 of the rotor blade 100, such as from generally adjacent the blade root 104 to generally adjacent the blade tip 106.

Moreover, each spoiler 102 may generally be positioned at any suitable location along the chord 120 of the rotor blade 100, such as by being spaced apart from the leading edge 114 of the shell 108 any suitable distance 124. For example, in several embodiments of the present subject matter, each spoiler 102 may be positioned a distance 124 from the leading edge 114 ranging from about 5% to about 30% of the corresponding chord 120 defined at the specific spanwise location of the spoiler 102, such as from about 10% to about 20% of the corresponding chord 120 or from about 15% to about 25% and all other subranges therebetween. However, in other embodiments, it should be appreciated that the spoilers 102 may be spaced apart from the leading edge a distance 124 that is less than 5% of the length of the corresponding chord 120 or that is greater than 30% of the length of the corresponding chord 120. For instance, in one embodiment, one or more of the spoilers 102 may be positioned adjacent to the trailing edge 116 of the rotor blade 100.

Further, in embodiments in which the rotor blade 100 includes more than one spoiler 102, the spoilers 102 may be spaced apart from one another along the rotor blade 100 in any direction. For instance, in the illustrated embodiment, the spoilers 102 are spaced apart from one another in the spanwise direction. In other embodiments, the spoilers 102 may be spaced apart from one another in the chordwise direction or in both the spanwise and chordwise directions. One of ordinary skill in the art should appreciate that the "chordwise direction" refers to a direction extending parallel to the chord 120 of the rotor blade 100 and the "spanwise direction" refers to the a direction extending parallel to the span 118 of the rotor blade 100.

Additionally, each spoiler 102 may generally extend any suitable length 126 along the rotor blade 100. For instance, in one embodiment, the spoilers 102 may have a length 126 generally equal to the span 118 of the rotor blade 100 such that each spoiler 102 extends from generally adjacent the blade root 104 to generally adjacent the blade tip 106. In other embodiments, the spoilers 102 may define shorter lengths 126. For example, in a particular embodiment of the present subject matter, the spoilers 102 may define a length that is less than 5 meters (m), such as less than 3 m or less than 2 m and all other subranges therebetween.

Further, in several embodiments, each spoiler 102 may be configured as a generally flat plate. For example, as shown in the illustrated embodiment, each spoiler 102 may comprise a plate-like member having a substantially rectangular cross-sectional shape. However, it should be appreciated that, in alternative embodiments, the spoilers 102 may generally define any other suitable shape that allows the spoilers 102 to disrupt the flow of air across the outer surface 122 of the shell 108. For example, the spoilers may have a triangular shape, a curved shape (e.g., a semi-elliptical or semi-circular shape), an "L" shape and/or any other suitable shape.

Moreover, in even further embodiments, each spoiler 102 may define one or more airflow features configured to enhance separation of the air from the outer surface 122 of the shell 108. For example, in one embodiment, the spoiler 102 may be configured as a corrugated plate. Thus, as particularly shown in FIG. 13, the spoiler 102 may generally define a zigzag pattern along its length. Such a corrugated configuration may generally serve to increase flow separation as the air moves along the outer surface 122 of the shell 108 and contacts the spoiler 102. However, in alternative embodiments, the spoiler 102 may include any other suitable airflow features, such as by defining ridges, angled features, openings and the like.

Referring particularly now to FIGS. 4 and 5, each spoiler 102 may include a base end 128 coupled to an actuator 130 disposed within the rotor blade 100. In general, the actuator 130 may be configured to displace the spoiler 102 between the actuated position (FIGS. 2-4) and the recessed position (FIG. 5). Accordingly, it should be appreciated that the actuator 130 may generally comprise any suitable device capable of moving the spoiler 102 relative to the shell 108. For example, in several embodiments, the actuator 130 may comprise a linear displacement device configured to linearly displace the spoiler 102 between the actuated and recessed positions. In the context of the present subject matter, the term "linearly displace" refers to the displacement of a surface feature along a straight line. Thus, in one embodiment, the actuator 130 may comprise a hydraulic, pneumatic or any other suitable type of cylinder configured to linearly displace a piston rod 132. Thus, as shown in FIGS. 4 and 5, the base end 128 of the spoiler 102 may be attached to the piston rod 132 such that, as the piston rod 132 is actuated, the spoiler 102 is linearly displaced relative to the shell 108. In other embodiments, the actuator 130 may comprise any other suitable linear displacement device, such as a rack and pinion, a worm gear driven device, a cam actuated device, an electro-magnetic solenoid or motor, other electro-magnetically actuated devices, a scotch yoke mechanism and/or any other suitable device.

It should be appreciated that any suitable number of actuators 130 may be utilized to move each spoiler 102 between the actuated and recessed positions. For instance, in one embodiment, two or more actuators 130 may be coupled to the base end 128 of each spoiler 102 at differing locations along the length 128 of the spoiler 102. However, in another embodiment, a single actuator 130 may be utilized to move the spoiler 102. It should also be appreciated that, although the actuator 130 and spoiler 102 are depicted as being oriented substantially perpendicularly to the outer surface 122 of the shell 108, the actuator 130 and spoiler 102 may generally be configured to have any suitable orientation relative to the shell 108.

Additionally, each spoiler may generally extend from its base end 128 to a tip end 134 disposed opposite the base end 128. The tip end 134 may generally define the top surface and/or outermost point of the spoiler 102. As such, when the spoiler 102 is moved to the actuated position, a height 136 may be defined between the tip end 134 and the outer surface 122. It should be appreciated that the actuator 130 may generally be configured to actuate the tip end 134 to any suitable height 136 above the outer surface 122. However, in several embodiments of the present subject matter, the height 136 may range from about 0.05% to about 1.5% of the corresponding chord 120 defined at the specific spanwise location of the spoiler 102, such as from about 0.1% to about 0.3% of the corresponding chord 120 or from about 0.5% to about 1.2% of the corresponding chord 120 and all other subranges therebetween. Thus, in such embodiments, the ranges of the heights 136 may generally increase as the spoiler 102 is positioned closer to the blade root 104 and may generally decrease as the spoiler 102 is positioned closer to the blade tip 106. In other embodiments, it should be appreciated that the height 136 may be less than 0.05% of the corresponding chord 120 defined at the specific spanwise location of the spoiler 102 or may be greater than 1.5% of the corresponding chord 120.

It should also be appreciated that the height 136 to which the tip end 134 of each spoiler 102 may be actuated need not be fixed. For example, the actuator 130 may be configured to actuate the spoilers 102 to varying heights 136 depending on the loads acting on the rotor blade 100. In particular, depending on the magnitude of the blade loading (e.g., the amount of the lift being generated by the rotor blade 100), the actuator 130 may configured to actuate the spoilers 102 to a specific height 136 designed to sufficiently separate the flow of air from the shell 108 so as to achieve the desired load reduction.

Additionally, in several embodiments of the present subject matter, the tip end 134 of each spoiler 102 may be configured to be generally aligned with the outer surface 122 of the shell 108 when the spoiler 102 is moved to the recessed position. In such embodiments, it should be appreciated that the tip end 134 of each spoiler 102 may be configured to define an aerodynamic profile generally corresponding to the aerodynamic profile of the outer surface 122 of the shell 108 in the area adjacent to the spoiler 102. For example, as shown in FIG. 5, when the spoiler 102 is in the recessed position, the tip end 134 may generally be positioned substantially flush with the outer surface 122 of the shell 108. As such, a generally smooth and continuous aerodynamic profile may be defined between the outer surface 122 and the spoiler 102.

Referring now to FIGS. 6 and 7, there are illustrated partial, cross-sectional views of another embodiment of a rotor blade 200 having an actuatable spoiler 202 disposed therein in accordance with aspects of the present subject matter. In general, rotor blade 200 may be configured the same as or similar to the rotor blade 100 described above with reference to FIGS. 2-5. Thus, the rotor blade 200 may include a shell 208 having an outer surface 222 and defining a pressure side 110 and a suction side 112 extending between leading and trailing edges 114, 116 (FIG. 3). Additionally, the illustrated spoiler 202 and actuator 230 may generally be configured the same as or similar to the spoiler 102 and actuator 130 described above with reference to FIGS. 2-5. Thus, the spoiler may generally extend between a base end 228 coupled to the actuator 230 and a tip end 234 defining the top surface and/or outermost point of the spoiler 202. Additionally the actuator 230 may generally be configured to move the spoiler 202 between an actuated position (FIG. 6) and a recessed position (FIG. 7), such as by linearly displacing the spoiler 202 between the actuated and recessed positions.

However, unlike the embodiments described above, the spoiler 202 may be configured to be fully recessed within the shell 208 when the spoiler 202 is moved to the recessed position. For example, as shown in FIG. 7, a gap 238 may be defined between the tip end 234 of the spoiler 202 and the inner surface 240 of the shell 208 when the spoiler 202 is in the recessed position. In such an embodiment, the rotor blade 200 may generally include a closure feature 244 configured to close, cover and/or fill-in the opening 242 defined in the shell 208 through which the spoiler 202 is actuated.

Thus, in several embodiments, the closure feature 244 may comprise a flap 246 pivotally attached to the shell 208 in an area adjacent to the opening 242. For example, as shown in the illustrated embodiment, the flap 246 may be pivotally attached to the shell 208 using a hinge 248 disposed between the flap 246 and the shell 208. As such, the flap 246 may pivot between an opened position and a closed position as the spoiler 202 is actuated. In particular, as shown in FIG. 6, the flap 246 may be configured to pivot upwards and away from the opening 242 as the spoiler 202 is moved to the actuated position. Similarly, as shown in FIG. 7, the flap 246 may be configured to pivot downwards and towards the opening 242 as the spoiler 202 is moved to the recessed position. Additionally, in several embodiments, to ensure that the flap 246 remains in the closed position when the spoiler 202 is moved to the recessed position, the hinge 248 may include a biasing mechanism configured to bias the flap 246 towards the opening 242. For example, the hinge 246 may be configured as a spring-loaded hinge or may comprise any other suitable hinge configured to provide a biasing force against the flap 246.

Moreover, the outer surface 250 of the flap 246 may generally be configured to define an aerodynamic surface or profile corresponding to the aerodynamic profile of the outer surface 222 of the shell 208 in the area adjacent to the opening 242. For example, as shown in FIG. 7, when the flap 246 pivots to the closed position, the outer surface 250 of the flap 246 may generally be positioned substantially flush with the outer surface 222 of the shell 208. As such, a generally smooth and continuous aerodynamic profile may be defined between the shell 208 and the flap 246. Additionally, as shown in the illustrated embodiment, both the shell 208 and the flap 246 may generally define corresponding tapered edges 252. Thus, when the flap 246 pivots to the closed position, the tapered edges 252 of the flap 246 and shell 202 may be aligned to ensure that a smooth aerodynamic transition is defined across the outer surface 222 of the rotor blade 200.

It should also be appreciated that, as an alternative to the spoilers 102, 202 described above with reference to FIGS. 2-7, any other suitable surface feature may be coupled to the disclosed actuators 130, 230 to enable such surface feature to be linearly displaced from within the rotor blade 100, 200 to a position at or above the outer surface 122, 222 of the shell 108, 208. For example, in an alternative embodiment, a vortex generator, such as the vortex generator 364 described below with reference to FIGS. 8-12, may be coupled to the actuators 130, 230 to permit the vortex generator to enhance the flow of air across the outer surface 122, 222 of the rotor blade 100, 200.

Referring now to FIGS. 8-12, there is illustrated one embodiment of a rotor blade 300 having an actuatable surface feature assembly 360 (hereinafter referred to as the "assembly 360" or the "actuatable assembly 360") installed therein in accordance with aspects of the present subject matter. In particular, FIG. 8 illustrates a cross-sectional view of the actuatable assembly 360 in a recessed position within the rotor blade 300. FIGS. 9-11 illustrate partial, cross-sectional views of the actuatable assembly 360 in actuated positions, particularly illustrating the various surface features 362, 364, 366 of the assembly 360. Additionally, FIG. 12 illustrates a perspective view of the actuatable assembly 360 shown in FIGS. 8-11.

In general, the rotor blade 300 may be configured the same as or similar to the rotor blades 100, 200 described above with reference to FIGS. 2-7. Thus, the rotor blade 300 may include a shell 308 having an outer surface 322. Additionally, the shell 308 may generally define a pressure side 310 and a suction side 312 extending between leading and trailing edges 314, 316.

Moreover, as shown, the rotor blade 300 may also include an actuatable assembly 360 having a plurality of surface features 362, 364, 366 extending outwardly from a base 368. Each surface feature 362, 364, 366 may generally be configured to provide a differing surface condition to the rotor blade 300. For example, one or more of the surface features 362, 364, 366 may be configured to enhance or disrupt the flow of air across the outer surface 322 of the shell 308. Additionally, the base 368 of the actuatable assembly 360 may generally be configured to be selectively actuated, both linearly and rotationally, in order to displace the surface features 362, 364, 366 relative to the shell 308 and to also align the surface features 362, 364, 366 with an opening 342 defined in the shell 308. In particular, the base 368 may be configured to be linearly actuated so as to move the assembly 360 between a recessed position (FIG. 8), wherein the entire assembly 360 is recessed within the shell 308, and an actuated position (FIGS. 9-11), wherein one of the surface features 362, 364, 366 of the assembly 360 is received within the opening 342. In addition, when the actuatable assembly 360 is in the recessed position, the base 368 may be configured to be rotated to adjust the alignment of the surface features 362, 364, 366 relative to the opening 342. Specifically, the base 368 may be rotated in order to vary which of the surface features 362, 364, 366 is to be received within the opening 342 when the assembly 360 is moved to the actuated position. As such, the actuatable assembly 360 may generally provide a means for selectively varying the surface condition of the rotor blade 300.

It should be readily appreciated that the disclosed assembly 360 may generally include any suitable surface features 362, 364, 366 known in the art. For example, in the illustrated embodiment, the actuatable assembly 360 may include a spoiler 362, a vortex generator 364 and a skin segment 366 spaced apart around the outer perimeter of the base 368. However, in other embodiments, the actuatable assembly 360 may include any other suitable combination and/or number of surfaces features 362, 364, 366. For instance, the assembly 360 may include two or more spoilers 362 of differing configurations, two or more vortex generators 364 of differing configurations and/or any other suitable combination of surface features 362, 364, 366.

In general, each surface feature 362, 364, 366 may be configured to extend outwardly from the base 368 such that, when the actuatable assembly 360 is moved to the actuated position, the surface feature 362, 364, 366 received within the opening 342 may provide a differing effect to the air flowing along the outer surface 322 of the shell 308. For example, in the illustrated embodiment, the spoiler 362 may be configured to disrupt or otherwise separate the flow of air from the outer surface 322, while the vortex generator 364 may be configured to delay flow separation of air from the outer surface 322. Similarly, the skin segment 366 may be configured to create a generally smooth and continuous aerodynamic profile across the outer surface 322. Thus, it should be appreciated that the particular surface feature 362, 364, 366 chosen to be received within the opening 342 may generally depend upon the desired aerodynamic performance of the blade 300 and/or the operating conditions of the wind turbine 10 (e.g., wind speeds and blade loading). For instance, as shown in FIG. 8, the actuatable assembly 360 is generally oriented within the rotor blade 300 such that the skin segment 360 is aligned with the opening 342. As such, when the assembly 360 is moved to the actuated position (FIG. 9), the skin segment 366 may be received within the opening 242 so as to provide the rotor blade 300 with a continuous aerodynamic surface for the flow of air across the shell 308. However, in other instances, it may be desirable to disrupt or enhance the flow of air across the outer surface 322 of the shell 308. In such instances, the actuatable assembly 360 may be moved to the recessed position to permit the spoiler 362 or vortex generator 264 to be aligned with the opening 342 by rotating the base 368. Once the spoiler 362 or vortex generator 364 is properly oriented relative to the opening 342, the assembly 360 may then be moved back to the actuated position (FIGS. 10 and 11).

It should be appreciated that the opening 342 defined in the shell 308 may generally have any suitable configuration that permits the surface features 362, 364, 366 to be properly positioned relative to the outer surface 322. For example, in the illustrated embodiment, the dimensions of the opening 342 (e.g., the width and length) may generally be chosen such that at least a portion of the spoiler 362, the vortex generator 364 and skin segment 366 may be received within the opening 342. Additionally, as shown, the opening 343 may include tapered edges 370 corresponding to the tapered edges 372 defined by each surface feature 362, 364, 366. Such tapered edges 370, 372 may generally ensure properly alignment of the surface features 362, 364, 366 within the opening 342 and may also eliminate any gaps from being formed between the shell 308 and the surface features 362, 364, 366 when the assembly 360 is moved to the actuated position.

It should also be appreciated that the spoiler 362 of the disclosed assembly 360 may generally be configured the same as or similar to the spoilers 102, 202 described above with reference to FIGS. 2-7. Thus, the spoiler 362 may generally have any suitable shape that allows it to disrupt the flow of air across the outer surface 322 of the shell 308. For example, in the illustrated embodiment, the spoiler 362 has a generally triangular cross-sectional shape. However, in alternative embodiments, the spoiler 362 may have various other suitable cross-sectional shapes, such as a rectangular shape, a curved shape (e.g., a semi-elliptical or semi-circular shape) or an "L" shape. The spoiler 362 may also define one or more airflow features. For instance, the spoiler 362 may define a corrugated configuration similar to the spoiler 102 shown in FIG. 13. Additionally, the spoiler 362 may generally define any suitable length 326 along the rotor blade 300 and may define any suitable height 336 between its tip end 334 and the outer surface 322 of the shell 308 when the spoiler 362 is received within the opening 342. For example, in several embodiments of the present subject matter, the height 336 may range from about 0.05% to about 1.5% of the corresponding chord 320 defined at the specific spanwise location of the base 368, such as from about 0.1% to about 0.3% of the length of the corresponding chord 320 or from about 0.5% to about 1.2% of the corresponding chord 320 and all other subranges therebetween.

Additionally, as shown in FIGS. 10 and 12, the vortex generator 364 of the actuatable assembly 360 may generally have any suitable configuration that permits such surface feature 364 to delay separation of the air flowing across the rotor blade 300. Thus, in several embodiments, the vortex generator 364 may comprise a plurality of vanes, bumps, ridges and/or other suitable surface projections configured to create a vortex in the air flowing along the outer surface 322. As is generally understood, the vortices created by a vortex generator 364 may increase the forward momentum of the airflow, thereby encouraging the air to remain attached to the outer surface 322 of the shell 308. For example, as particularly shown in FIG. 12, the vortex generator 364 may include a plurality of vanes 374 spaced apart along a support member 376 extending outwardly from the base 368. Each vane 374 may generally be configured to be angled relative to the direction of the airflow such that vortices may be generated at the downstream ends 378 of the each vane 374. Additionally, the top surface 380 of the support member 376 may generally define an aerodynamic profile corresponding to the aerodynamic profile of the outer surface 322 of the shell 300. As such, a substantially smooth and continuous aerodynamic surface may be defined across the rotor blade 300 at the locations of the vortex generator 364 not including vanes 374.

Further, as shown in FIG. 9, the skin segment 366 of the actuatable assembly 360 may generally extend outwardly from the base 368 so as to define a top surface 382 having an aerodynamic profile. The aerodynamic profile of the surface 382 may generally be configured to correspond to the aerodynamic profile of the outer surface 322 of the shell 308 in the area adjacent to the opening 342. As such, the rotor blade 300 may generally define a substantially continuous aerodynamic profile between the outer surface 322 and the skin segment 366. It should be appreciated that, in alternative embodiments, the disclosed assembly 360 need not include a skin segment 366. In such embodiments, a closure feature, similar to the flap 246 described above with reference to FIGS. 6 and 7, may be utilized to provide an aerodynamic surface across the rotor blade 300 when the assembly 360 is in the recessed position.

It should also be appreciated that the base 368 of the actuatable assembly 360 may generally have any suitable shape and/or configuration that permits the surface features 362, 364, 366 to be supported thereon. For example, in the illustrated embodiment, the base 368 generally has a circular cross-sectional shape. However, in other embodiments, the base 368 may have a triangular cross-sectional shape, a rectangular cross-sectional shape or any other suitable shape. Additionally, it should be appreciated that the surface features 362, 364, 366 may be formed integrally with the base 368 (e.g., by using a molding process) or the surface features 362, 364, 366 may be configured to be separately attached to the base 368, such as by attaching the surface features 362, 364, 366 to the base 368 using mechanical fasteners (e.g., screws, bolts, rivets, pins, clips and the like), adhesives, and/or any other suitable attachment means and/or method (e.g., welding).

Referring still to FIGS. 8-12, to permit the actuatable assembly 360 to be actuated within the shell 308, the assembly 360 may generally be coupled to an actuator 384 disposed within the rotor blade 300. In general, the actuator 384 may comprise any suitable device and/or combination of devices capable of actuating the base 368 both linearly and rotationally relative to the opening 342. Thus, in several embodiments, the actuator 384 may comprise a combination of a linear displacement device and a rotational displacement device. For example, as shown in FIG. 8, the actuator 384 may comprise a cylinder 386 (e.g., a hydraulic or pneumatic cylinder) and a motor 390 coupled to a piston rod 388 of the cylinder 386. The motor 390 may, in turn, be rotatably attached to the actuatable assembly 360, such as by being attached to the assembly 360 by a shaft 392 extending through the base 368. Accordingly, when the piston rod 388 is actuated, both the motor 390 and the assembly 360 may be linearly displaced between the recessed and actuated positions to allow the surface features 362, 364, 366 to be received within and removed from the opening 342. Similarly, when the assembly 360 is in the recessed position, the base 368 may be rotated by the motor 390 in order to properly align one of the surface features 362, 364, 366 with the opening 342.

It should be appreciated that, in alternative embodiments, the disclosed actuator 384 may comprise any other suitable device and/or combination of devices known in the art. For instance, other suitable linear displacement devices may include, but are not limited to, a rack and pinion, a worm gear driven device, a cam actuated device, an electro-magnetic solenoid or motor, other electro-magnetically actuated devices and/or a scotch yoke mechanism. Similarly, other suitable rotational displacement devices may include, but are not limited to, gear driven devices, belt and pulley arrangements and the like. It should also be appreciated that any suitable number of actuators 384 may be coupled to the actuatable assembly 360. For example, as particularly shown in FIG. 12, an actuator 360 may be coupled to each end of the assembly 360, such as by coupling the motor 390 of each actuator 384 to the shaft 392 extending through the base 368.

Additionally, it should be appreciated that the rotor blade 300 may generally include any number of actuatable assemblies 360. For example, similar to the embodiment shown in FIG. 2, three actuatable assemblies 360 may be spaced apart within the rotor blade 300 in the spanwise direction in order to permit the surface conditions of the blade 300 to be varied at differing locations along its span 118 (FIG. 2). Moreover, each assembly 360 may generally be disposed at any suitable location along the rotor blade 300, such as by being located on the pressure side 310 or the suction side 312 of the blade 300. Additionally, each assembly 360 may be disposed at any suitable location along the span 118 (FIG. 2) of the rotor blade 300 and at any suitable location along the chord 320 of the blade 300. For example, as shown in FIG. 8, each assembly 360 may be positioned along the chord 320 any suitable distance 394 from the leading edge 314 of the shell 308, such as by being positioned a distance 394 from the leading edge 314 ranging from about 5% to about 30% of the corresponding chord 320 defined at the specific spanwise location of the base 368, such as from about 10% to about 20% of the corresponding chord 320 or from about 15% to about 25% of the corresponding chord 320 and all other subranges therebetween. However, in other embodiments, it should be appreciated that the actuatable assembly 360 may be spaced apart from the leading edge 314 a distance 394 that is less than 5% of the corresponding chord 320 defined at the specific spanwise location of the assembly 360 or that is greater than 30% of the corresponding chord 320.

Further, it should be appreciated that, when the disclosed rotor blades 100, 200, 300 include more than one actuatable spoiler 102, 202 and/or more than one actuatable assembly 360, the actuators 130, 230 coupled to the spoilers 102, 202 and/or the assemblies 360 may be controlled individually or in groups. For example, it may be desirable to actuate only a portion of the spoilers 102, 202 and/or the assemblies 360 disposed within the rotor blade 100, 200, 300 in order to precisely control the amount of lift generated by the blade 100, 200, 300. Similarly, it may be desirable to actuate the spoilers 102, 202 and/or assemblies 360 to differing heights depending upon on the spanwise location of each of the spoilers 102, 202 and/or assemblies 360. It should also be appreciated that any suitable means may be utilized to control the actuators 130, 230, 384. For example, the actuators 130, 230, 384 may be communicatively coupled to the turbine controller (not shown) of the wind turbine 10 or any other suitable control device (e.g. a computer and/or any other suitable processing equipment) configured to control the operation of the actuators 130, 230, 384.

Additionally, in several embodiments of the present subject matter, the disclosed rotor blades 100, 200, 300 may include any suitable means for determining the operating conditions of the blades 100, 200, 300 and/or the wind turbine 10 (FIG. 1). Thus, in one embodiment, one or more sensors (not shown), such as load sensors, position sensors, speed sensors, strain sensors and the like, may be disposed at any suitable location along the rotor blade 100, 200, 300 (e.g., at or adjacent to the blade root 104 (FIG. 2)), with each sensor being configured to measure and/or determine one or more operating conditions of the rotor blade 100, 200, 300. For example, the sensors may be configured to measure the wind speed, the loading occurring at the blade root 104, the deformation of the blade root 104, the rotational speed of the rotor blade 100, 200, 300 and/or any other suitable operating conditions. The disclosed spoiler(s) 102, 202 and/or assembly(ies) 360 may then be actuated based upon the measured/determined operating conditions to optimize the performance of the rotor blade 100, 200, 300. For instance, the sensors may be communicatively coupled to the same controller and/or control device as the actuators 130, 230, 384 such that the spoiler(s) 102, 202 and/or assembly(ies) 360 may be actuated automatically based on the output from the sensors. Thus, in one embodiment, if the output from the sensors indicates that the wind speeds, root loading and/or root deformation is/are significantly high, the disclosed spoilers 102, 202, 362 may be moved to the actuated position in order to separate the airflow from the rotor blade 100, 200, 300 and reduce the loading and/or deformation on the blade root 104. Similarly, if the sensors indicate that flow separation is occurring or is likely to occur, the disclosed vortex generator 364 may be moved to the actuated position in order to prevent flow separation and enhance the performance of the rotor blade 300. However, it should be appreciated that, in alternative embodiments, the disclosed surface features 102, 202, 362, 364, 366 need not be controlled based on output(s) from a sensor(s). For example, the surfaces features 102, 202, 362, 364, 366 may be moved to the actuated position based on predetermined operating conditions and/or predetermined triggers programmed into the control logic of the turbine controller or other suitable control device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
    a shell having a pressure side and a suction side, said shell defining an opening in at least one of said pressure side and said suction side;
    a base at least partially disposed within said shell, said base being movable relative to said opening between a recessed position and an actuated position; and,
    at least two surface features spaced apart along an outer perimeter of said base,
    wherein said base is rotatable within said shell in order to adjust which of said at least two surface features is received within said opening when said base is moved to said actuated position.

2. The rotor blade of claim 1, wherein one of said at least two surface features comprises a spoiler.

3. The rotor blade of claim 2, wherein said spoiler defines a substantially rectangular cross-sectional shape.

4. The rotor blade of claim 2, wherein said spoiler is configured as a corrugated plate.

5. The rotor blade of claim 2, wherein a height is defined between a tip end of said spoiler and an outer surface of said shell when said spoiler is received within said opening, said height ranging from about 0.05% to about 1.5% of the chord defined at a spanwise location of said base.

6. The rotor blade of claim 1, wherein one of said at least two surface features comprises a vortex generator.

7. The rotor blade of claim 6, wherein said vortex generator comprises a plurality of angled vanes.

8. The rotor blade of claim 1, wherein one of said at least two surface features comprises a skin segment, said skin segment defining an aerodynamic profile generally corresponding to an aerodynamic profile of an outer surface of said shell.

9. The rotor blade of claim 1, wherein said at least two surface features comprises a spoiler, a vortex generator and a skin segment spaced apart along said outer perimeter of said base.

10. The rotor blade of claim 1, wherein said base is disposed a distance from a leading edge of said shell ranging from about 5% to about 30% of the chord defined at a spanwise location of said base.

11. The rotor blade of claim 1, further comprising an actuator disposed within said shell, said actuator being configured to move said base between said recessed and actuated positions.

12. The rotor blade of claim 11, wherein said actuator is further configured to rotate said base within said shell when said base in said recessed position.

13. The rotor blade of claim 12, wherein said actuator comprises a linear displacement device coupled to a rotational displacement device.

14. A wind turbine comprising:
    a tower;
    a nacelle mounted atop said tower;
    a rotor hub coupled to said nacelle; and
    a plurality of rotor blades extending outwardly from said rotor hub, at least one of said plurality of rotor blades comprising:
        a shell having a pressure side and a suction side, said shell defining an opening in at least one of said pressure side and said suction side;
        a base at least partially disposed within said shell, said base being movable relative to said opening between a recessed position and an actuated position; and,
        at least two surface features spaced apart along an outer perimeter of said base,
        wherein said base is rotatable within said shell in order to adjust which of said at least two surface features is received within said opening when said base is moved to said actuated position.

15. The wind turbine of claim 14, wherein one of said at least two surface features comprises a spoiler.

16. The wind turbine of claim 15, wherein a height is defined between a tip end of said spoiler and an outer surface of said shell when said spoiler is received within said opening, said height ranging from about 0.05% to about 1.5% of the chord defined at a spanwise location of said base.

17. The wind turbine of claim 14, wherein one of said at least two surface features comprises a vortex generator.

18. The wind turbine of claim 14, wherein one of said at least two surface features comprises a skin segment, said skin segment defining an aerodynamic profile generally corresponding to an aerodynamic profile of an outer surface of said shell.

19. The wind turbine of claim 14, wherein said at least two surface features comprises a spoiler, a vortex generator and a skin segment spaced apart along said outer perimeter of said base.

20. The wind turbine of claim 14, further comprising an actuator disposed within said shell, said actuator being configured to move said base between said recessed and actuated positions and rotate said base within said shell when said base in said recessed position.

* * * * *